(12) United States Patent  (10) Patent No.: US 9,386,110 B2
Cudak et al.  (45) Date of Patent: Jul. 5, 2016

(54) COMMUNICATIONS RESPONSIVE TO RECIPIENT SENTIMENT

(71) Applicant: Lenovo Enterprise Solutions (Singapore) Pte. Ltd., Singapore (SG)

(72) Inventors: Gary D. Cudak, Creedmoor, NC (US); Lydia M. Do, Raleigh, NC (US); Michael M. Skeen, Raleigh, NC (US); Menlo Wuu, Raleigh, NC (US)

(73) Assignee: Lenovo Enterprise Solutions (Singapore) Pte. Ltd.

( * ) Notice: Subject to any disclaimer, the term of this patent is extended or adjusted under 35 U.S.C. 154(b) by 168 days.

(21) Appl. No.: 14/208,329

(22) Filed: Mar. 13, 2014

(65) Prior Publication Data

US 2015/0264145 A1    Sep. 17, 2015

(51) Int. Cl.
*G06F 17/30* (2006.01)
*H04L 29/08* (2006.01)
*H04L 12/18* (2006.01)
*H04M 3/42* (2006.01)
*G06Q 10/10* (2012.01)
*H04L 12/58* (2006.01)

(52) U.S. Cl.
CPC .......... *H04L 67/22* (2013.01); *G06F 17/30867* (2013.01); *G06Q 10/107* (2013.01); *H04L 12/1813* (2013.01); *H04L 51/043* (2013.01); *H04M 3/42365* (2013.01)

(58) Field of Classification Search
CPC . H04L 67/22; H04L 12/2602; H04L 12/5815; H04L 12/1813; H04L 51/043; G06F 17/30876; G06F 3/04847; H04M 3/42365; G06Q 10/107

USPC .............. 707/709, 736, 737, 770, 805, 917; 709/204, 206, 752, 753, 758; 704/9; 705/319; 715/700, 752, 753, 758, 808, 715/809, 810, 833
See application file for complete search history.

(56) References Cited

U.S. PATENT DOCUMENTS

2010/0325135 A1    12/2010  Chen et al.
2011/0208522 A1     8/2011  Pereg et al.
2011/0264531 A1 *  10/2011  Bhatia ................ G06Q 30/0269
                                                          705/14.66

(Continued)

FOREIGN PATENT DOCUMENTS

WO    2012089906 A1    7/2012

OTHER PUBLICATIONS

A.C.E.S Lima, "Automatic Sentiment Analysis of Twitter Messages" 2012 Fourth International Conference on Computational Aspects of Social Networks (CASoN), pp. 52-57, Nov. 21, 2012.

*Primary Examiner* — Greta Robinson
(74) *Attorney, Agent, or Firm* — Katherine S. Brown; Jeffrey L. Streets

(57) ABSTRACT

A computer program product includes a computer readable storage medium having program instructions embodied therewith, the program instructions executable by a processor to cause the processor to perform a method including receiving input from a first communication device of a first user identifying a target sentiment associated with a second user, monitoring current online activity of the second user to determine a current sentiment for the second user, and initiating communication between the first communication device of the first user and a second communication device of the second user in response to the current sentiment of the second user meeting the target sentiment input by the first user.

16 Claims, 6 Drawing Sheets

(56) References Cited

U.S. PATENT DOCUMENTS

| | | |
|---|---|---|
| 2012/0311032 A1 | 12/2012 | Murphy et al. |
| 2013/0080928 A1* | 3/2013 | Zhuang .............. H04L 12/1822 715/758 |
| 2013/0091117 A1 | 4/2013 | Minh |
| 2013/0103667 A1* | 4/2013 | Minh ................ G06F 17/30864 707/709 |
| 2013/0124192 A1* | 5/2013 | Lindmark ............ G06F 17/274 704/9 |
| 2013/0226561 A1 | 8/2013 | Park et al. |
| 2013/0238658 A1* | 9/2013 | Burris ............... G06F 17/30545 707/770 |
| 2014/0074728 A1* | 3/2014 | Margulies ............. G06Q 30/01 705/304 |
| 2014/0101247 A1* | 4/2014 | Pappas .................. H04L 67/22 709/204 |
| 2014/0303981 A1* | 10/2014 | Skiba ................. H04M 3/5175 704/270 |
| 2015/0062318 A1* | 3/2015 | Wexler .................. H04N 5/772 348/77 |

* cited by examiner

COMMUNICATIONS RESPONSIVE TO RECIPIENT SENTIMENT

BACKGROUND

1. Field of the Invention

The present invention relates to management of communications between two communication devices.

2. Background of the Related Art

Modern communications can take many different forms, including telephone calls, text messages, electronic mail, videotelephony, and social network posts. Each of these forms of communication has their own strengths and weaknesses. For example, text messages and email may be sent at the convenience of the sender and are then available at the convenience of the recipient. Accordingly, text messages and email are popular for many communications between busy individuals since, unlike a telephone call, they do not have to stop a current task in order to participate in the communication. However, text messages and email are embodied as written text and may not convey the sender's emotional state or urgency as well as a phone call where voice inflections can be heard. Videotelephony goes a step further than even a telephone call in sharing context of the communication by including a live videostream, such that facial expressions and surroundings may be viewed.

BRIEF SUMMARY

One embodiment of the present invention provides a computer program product comprising a computer readable storage medium having program instructions embodied therewith, the program instructions executable by a processor to cause the processor to perform a method comprising receiving input from a first communication device of a first user identifying a target sentiment associated with a second user, monitoring current online activity of the second user to determine a current sentiment for the second user, and initiating communication between the first communication device of the first user and a second communication device of the second user in response to the current sentiment of the second user meeting the target sentiment input by the first user.

Another embodiment of the present invention provides a computer program product comprising a computer readable storage medium having program instructions embodied therewith, the program instructions executable by a processor to cause the processor to perform a second method, comprising receiving input from a first communication device of a first user identifying a target sentiment associated with a group of users, wherein the group of users includes a plurality of users. The second method further comprises monitoring current online activity of the plurality of users to determine a current average sentiment for the group of users, and initiating the communication between the first communication device of the first user and a plurality of communication devices of the plurality of users in response to the current average sentiment for the group of users meeting the target sentiment input by the first user.

DETAILED DESCRIPTION

Figure 1:
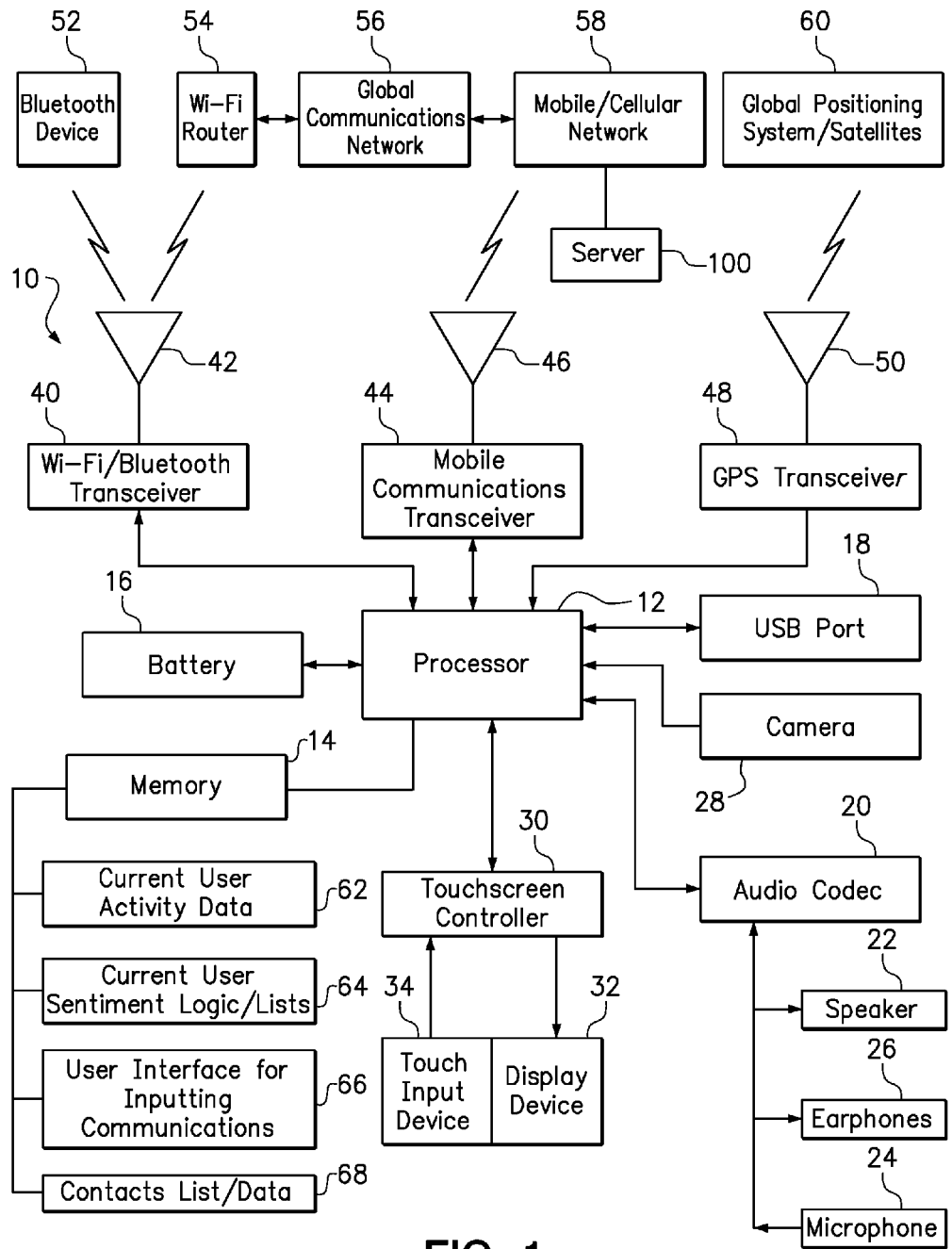
FIG. 1 is a block diagram of the components of a communication device in accordance with one embodiment of the invention.

One embodiment of the present invention provides a method, comprising receiving input from a first communication device of a first user identifying a target sentiment associated with a second user, monitoring current online activity of the second user to determine a current sentiment for the second user, and initiating communication between the first communication device of the first user and a second communication device of the second user in response to the current sentiment of the second user meeting the target sentiment input by the first user.

The input may, for example, be entered into the first communication device of the first user (sender/caller) through a touchscreen, voice commands, physical keys, or some other user interface. The second communication device may be identified by entering a name or number uniquely associated with the second communication device, such as a telephone number or email address. Preferably, the second communication device may be identified by selecting the second user from a contacts list stored on the first communication device or at least accessible to the first communication device.

In various embodiments of the preset invention, the communication is a written message. For example, the written message may be in a form for delivery to the second communication device as a text message, email message, chat application message, message board post, or social network post. In other embodiments of the present invention, the communication may be a phone call. For example, the phone call may be initiated by alerting the first communication device that the current sentiment of the second user meets the target sentiment input by the first user.

The target sentiment may be manually entered or selected from a graphical menu displayed on the first communication device. Without limitation, the target sentiment may be either a numerical sentiment threshold or a sentiment category. In one example, the target sentiment is a numerical sentiment threshold, and the communication is initiated in response to the current sentiment reaching the numerical sentiment threshold. Optionally, the step of monitoring current online activity of the second user to determine a current sentiment for the second user, may include counting the number of instances that the second user uses a word from a positive sentiment list and subtracting the number of instances that the second user uses a word from a negative sentiment list over a period of time. In a second example, the target sentiment is a sentiment category selected from among a plurality of sentiment categories, wherein each sentiment category has a list of words associated with the sentiment category. Accordingly, the step of monitoring current online activity of the second communication device to determine a current sentiment for the second user, may include counting the number of instances that the second user uses a word from each sentiment category during a period of time and determining the current sentiment that has the greatest number of instances during the period of time. Optionally, the plurality of sentiment categories may include a positive sentiment category and a negative sentiment category, and/or a rushed sentiment category and a relaxed sentiment category.

Determining a current sentiment for the second user may include analyzing content from various sources involving the second user (second communication device) to count the number of instances of words from the positive sentiment list and the number of instances of words from the negative sentiment list. The various sources of content involving the second user (second communication device) may include one or more source, such as current or recent voice conversations or voice messages, recent text messages and email messages, and recent posts to a blog or social media account. The current sentiment of the second user may be determined, for example, by the second communication device or a network server, since either device may be authorized to monitor the recipient's activity and share the results of the current sentiment determination. Since the second user may have a variety of online accounts with various services, such as social media accounts and email accounts, the method may identify the usernames of these accounts and attribute activity under these accounts to the second user.

A sentiment list may include any number of words, symbols, or phrases that indicate an attitude, thought, feeling, emotion, or expression. In a non-limiting example, a positive sentiment list may include words such as award, beautiful, cool, delicious, enjoy, fantastic, great, happy, ideal, joy, kind, lucky, magic, nice, outstanding, priceless, rewarding, special, terrific, and winner. By contrast, a negative sentiment list may include words such as ashamed, bad, critical, disrespect, embarrassment, humiliation, hurt, insult, offend, pain, resent, and wrong. Furthermore, a rushed sentiment list may include words such as late, hurry, tardy, busy, and frantic, whereas a relaxed sentiment list may include words such as vacation, play, recliner, television and friends.

In a further embodiment of the present invention, the method may further comprise receiving input from a first communication device of the first user identifying a time limit for initiating communication with the second communication device, such that the communication is initiated before expiration of the time limit. Optionally, the target sentiment may be reduced or modified as the time limit is approached.

In yet another embodiment, the communication may be a written message, and the written message may be received by the second communication device regardless of whether the current sentiment of the second user meets the target sentiment. However, in this embodiment, the written message is not displayed on the second communication device until the current sentiment of the second user meets the target sentiment.

Optionally, a first communication device of the first user may send a request for a current sentiment to the second communication device of the second user. For example, such a request may be sent periodically during a period after receiving the input identifying a target sentiment and until the communication has been initiated between the first communication device and the second communication device. In a further option, the second communication device may push the current sentiment of the second user to one or more systems accessible to the first communication device. For example, the one or more systems may be selected from a social network, an email group, and a list of mobile communication devices.

In some applications, a personalized graphic, known as an avatar, is used to represent a user. The methods of the present invention may be used along with these application and further comprise modifying an avatar associated with the second user based on the current sentiment of the second user, wherein the avatar is a personalized graphic designed to represent the second user, and wherein the avatar is displayed on the first communication device in association with the second communication device. The use of an avatar allows the sentiment of a user to be provided in a graphic form. Furthermore, the behavior or other characteristics of the avatar may be modified on the basis of the current sentiment of a user.

Yet another embodiment of the present invention provides a second method, comprising receiving input from a first communication device of a first user identifying a target sentiment associated with a group of users, wherein the group of users includes a plurality of users. The second method further comprises monitoring current online activity of the plurality of users to determine a current average sentiment for the group of users, and initiating the communication between the first communication device of the first user and a plurality of communication devices of the plurality of users in response to the current average sentiment for the group of users meeting the target sentiment input by the first user.

In regard to the second method, the target sentiment may be a numerical sentiment threshold, wherein the communication is initiated in response to the current average sentiment reaching the numerical sentiment threshold, and wherein monitoring current online activity of the plurality of user to determine a current average sentiment for the group of users, includes counting the number of instances that the plurality of users use a word from a positive sentiment list and subtracting the number of instances that the plurality of users use a word from a negative sentiment list over a period of time.

In further regard to the second method, the target sentiment may be a target sentiment category selected from among a plurality of sentiment categories, wherein each sentiment category has a list of words associated with the sentiment category, and wherein monitoring current online activity of the plurality of communication devices to determine a current average sentiment for the group of users, includes counting the number of instances that the plurality of users use a word from each sentiment category during a period of time and determining the current sentiment that has the greatest number of instances during the period of time.

Embodiments of the present invention use the current sentiment of a second user or recipient of a communication to determine an appropriate or optimal time to communicate with the second user. In other words, a communication can be contingent, not by the hour of the day or day of the week, but by the second user's sentiment or mood, such that the second user may be more receptive to the communication. For example, a first user may wish to collaborate, presenting ideas, provide notice of events or issues to/with the second user when the second user is in a "good" mood. Alternatively, a communication or message could be scheduled to provide support or an uplifting message when the second user is in a "bad" mood.

EXAMPLE

In one example scenario, Gary's son wants to ask Gary if he can have a friend over and play video games. Gary's son knows that Gary will generally respond "no" to requests to play video games unless Gary is in a particularly good mood. So, Gary's son prepares a text message to Gary and sets a threshold for Gary's current sentiment to be at least an 8 out of 10 on a numerical sentiment scale, where 1 is low (negative sentiment or bad mood) and 10 is high (positive sentiment or good mood). At 3:30 pm, Gary is not in a good mood (i.e., a current sentiment of 1) when the text message is scheduled, so the system delays sending or displaying the text message to Gary. At 4:00 pm, Gary is done with meetings, which makes him happy again, and his current sentiment at 4:05 pm rises (i.e., a current sentiment of 9) such that the message is delivered to Gary.

Continuing with the example, Gary's sentiment at 3:30 may be determined by counting the number of words in his text messages and other current online activity that are from a "Positive Sentiment" list and a "Negative Sentiment" list. Assume that the sentiment scale between "Negative" and "Positive is a scale from 1 to 10 and a "5" is considered neutral. Accordingly, the user's sentiment begins with a score of "5" and each use of a word from a negative word list subtracts from the score and each use of a word from a positive word list adds to the score. Also consider that the "current sentiment" is determined over a trailing period of 5 minutes, and the following are Gary's text messages between 3:25 and 3:30:

3:25—"I am sorry (−1) that I am running late (−1) to the meeting. I was delayed (−1) by a problem (−1) with my car. I will be there as soon as this traffic (−1) clears up. Thank you (+1) for understanding."

3:29—"Please correct a typo (−1) in my presentation before I arrive. I want to make a good (+1) impression."

So, at 3:30, Gary's current sentiment is 1 (5−6+2=1).

Gary's meeting is over at 4:00 pm and was successful, so Gary's text messages between 4:00 and 4:05 are as follows:

4:01—"Great (+1) meeting team! I am very proud (+1) of everyone involved in winning this new contract. We should celebrate (+1) tomorrow."

4:04—"The meeting went very well. (+1) I am heading home."

So, at 4:05, Gary's current sentiment is 9 (5+4=9).

Since Gary's current sentiment of 9 is equal to or greater than the target sentiment of 8 set by Gary's son, the text message prepared by Gary's son will now be delivered to Gary.

Yet another embodiment of the present invention provides a computer program product comprising a computer readable storage medium having program instructions embodied therewith, the program instructions executable by a processor to cause the processor to perform a method comprising receiving input from a first communication device of a first user identifying a target sentiment associated with a second user, monitoring current online activity of the second user to determine a current sentiment for the second user, and initiating communication between the first communication device of the first user and a second communication device of the second user in response to the current sentiment of the second user meeting the target sentiment input by the first user.

A still further embodiment of the present invention provides a computer program product comprising a computer readable storage medium having program instructions embodied therewith, the program instructions executable by a processor to cause the processor to perform a second method, comprising receiving input from a first communication device of a first user identifying a target sentiment associated with a group of users, wherein the group of users includes a plurality of users. The second method further comprises monitoring current online activity of the plurality of users to determine a current average sentiment for the group of users, and initiating the communication between the first communication device of the first user and a plurality of communication devices of the plurality of users in response to the current average sentiment for the group of users meeting the target sentiment input by the first user. This second method deals with the application of the invention to implementations where the communication is direct to a plurality of communication devices.

The foregoing computer program products may further include program instructions for implementing or initiating any one or more aspects of the methods described herein. Accordingly, a separate description of the methods will not be duplicated in the context of a computer program product.

FIG. 1 is a block diagram of a non-limiting example of a communication device 10, such as a smart phone, capable of implementing embodiments of the present invention. The block diagram may be representative of both a first communication device and a second communication device in accordance with various embodiments of the present invention. The communication device 10 may include a processor 12, memory 14, a battery 16, a universal serial bus (USB) port 18, a camera 28, and an audio codec 20 coupled to a speaker 22, a microphone 24, and an earphone jack 26. The communication device 10 may further include a touchscreen controller 30 which provides a graphical output to the display device 32 and an input from a touch input device 34. Collectively, the display device 32 and touch input device 34 may be referred to as a touchscreen.

The communication device 10 may also include a Wi-Fi and/or Bluetooth transceiver 40 and corresponding antenna 42 allowing the device to communicate with a Bluetooth device 52 or a Wi-Fi router 54, a mobile communication transceiver 44 and corresponding antenna 46 allowing the device to communicate over a mobile/cellular network 58, and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet. Furthermore, mobile/cellular network 58 may include or access a server for the purpose of storing user activity, determining current user sentiment, inputting communications, or maintaining contacts data for the communication device 10. When the communication device 10 has memory 14 with sufficient capacity, it may be preferable to include any or all of these data storage and logic functions within the communication device itself. As shown, the memory 14 stores current user activity data 62, current user sentiment logic/lists 64, a user interface for inputting communications 66, and a contacts list or data 68.

Figure 2:
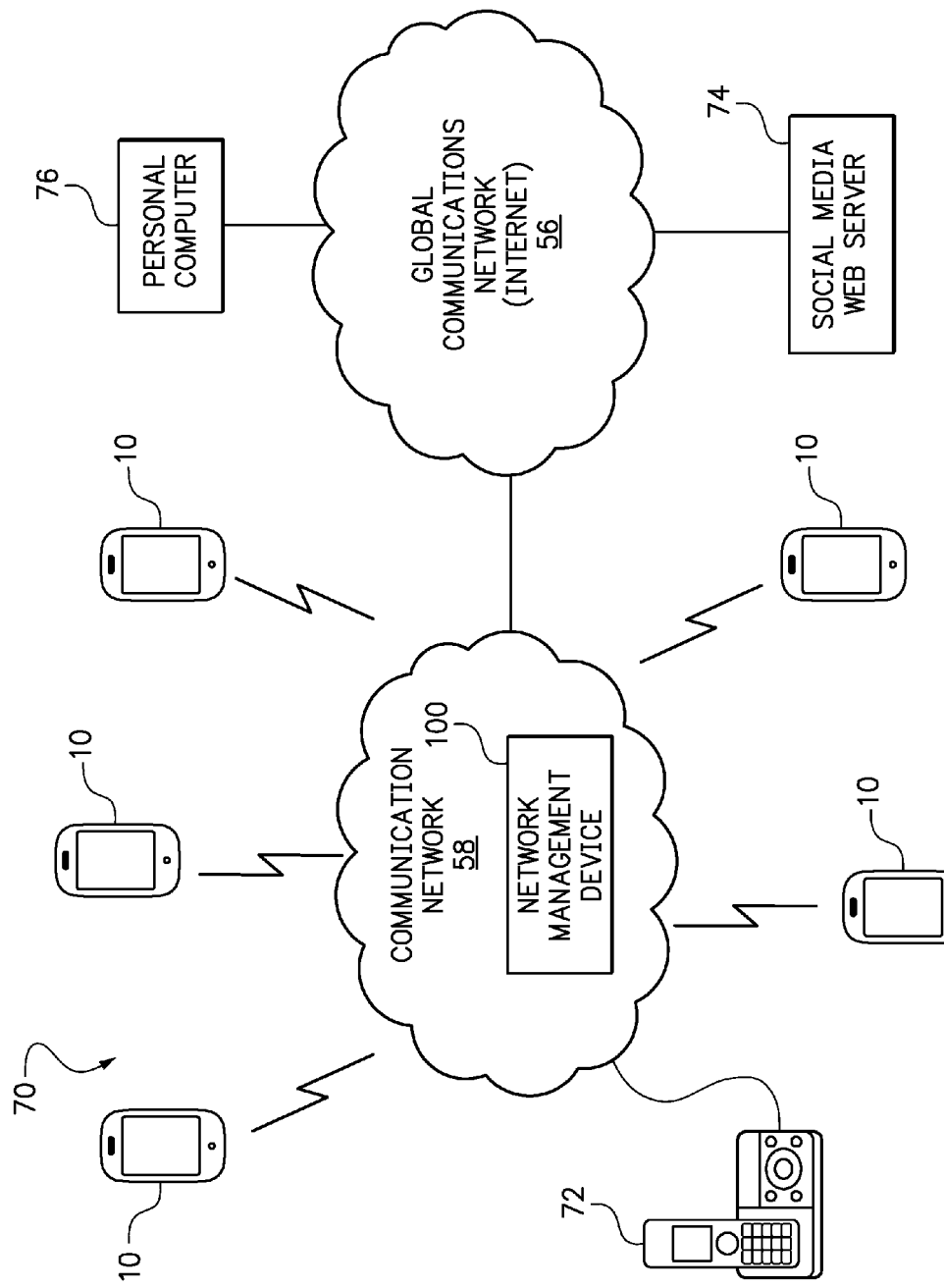
FIG. 2 is a diagram of a system including a communication network enabling communication between a plurality of communication devices, including a mobile communication device.

FIG. 2 is a diagram of a system 70 including a communication network 58 enabling communication between a plurality of communication devices, such as a telephone 72 coupled to a land line and multiple mobile communication devices 10. The communication network 58 may be managed by a network management device 100. The network management device or server 100 may be responsible for establishing connections between communications devices, and may also provide one or more services to the communications devices. For example, although the methods of the invention may be implemented within the communication devices 10, 72 it is also possible to implement one or more steps of the methods or one or more functions of the computer program code of the present invention in the network management device 100. In one non-limiting example, the network management device 100 may provide current user activity data 62, current user sentiment logic/lists 64, a user interface for inputting communications 66, and a contacts list or data 68.

The communication network 58 may also allow communication with a global communications network 56, such as the Internet. Accordingly, a social media web server 74 may be accessed by the communication devices 10, or may be accessed by a personal computer 76. A given user may own and control a communication device 10 and a personal computer 76, and may access the social media web server 74 from either device. Accordingly, the user's social media account may be accessed using either device 10, 76. A history of social media interaction, or even email, blogging or other online activity, may be maintained on the individual devices 10, 76, on the social media web server 74 or one or more similar servers.

Figure 3:
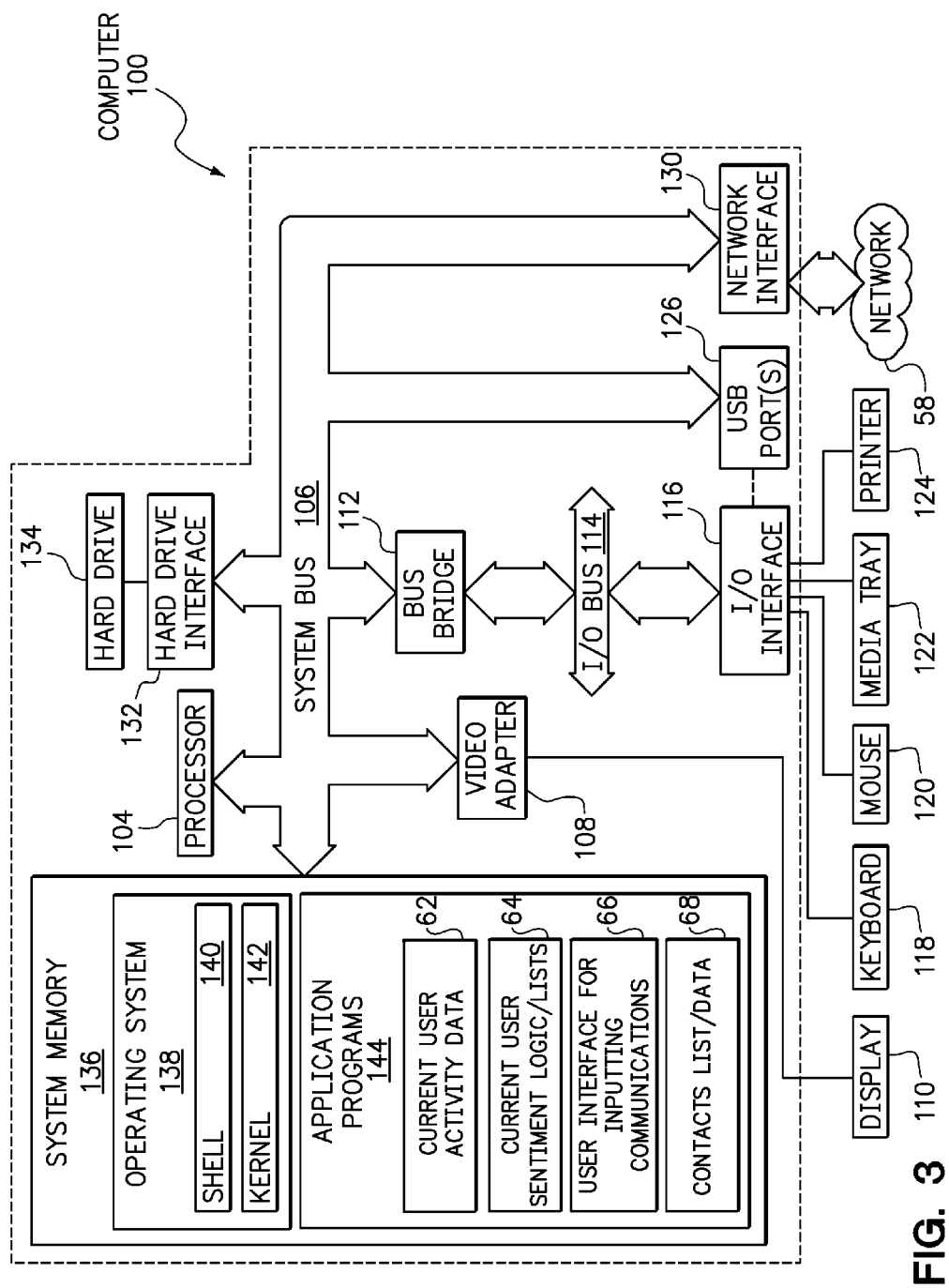
FIG. 3 is a diagram of an exemplary compute node (or simply "computer") that may be utilized consistent with some embodiments of the present invention.

FIG. 3 is a diagram of an exemplary compute node or server (or simply "computer") 100 that may be utilized consistent with one or more embodiments of the present invention. Note that some or all of the exemplary architecture, including both depicted hardware and software, shown for and within computer 100 may be implemented in the server or network management device 100 as shown in FIGS. 1-2. The computer 100 is also illustrative of a social media web server 74, personal computer 76, or other server that may implement one or more feature of the present invention.

The computer 100 includes a processor unit 104 that is coupled to a system bus 106. Processor unit 104 may utilize one or more processors, each of which has one or more processor cores. A video adapter 108, which drives/supports a display 110, is also coupled to the system bus 106. The system bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and USB port(s) 126. While the format of the ports connected to I/O interface 116 may be any known to those skilled in the art of computer architecture, in a preferred embodiment some or all of these ports are universal serial bus (USB) ports. As depicted, the computer 100 is able to communicate over a network 58 using a network interface 130. The network 58 may be an external network such as the cellular network or global communication network 56, and perhaps also an internal network such as an Ethernet or a virtual private network (VPN).

A hard drive interface 132 is also coupled to system bus 106. The hard drive interface 132 interfaces with a hard drive 134. In a preferred embodiment, the hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes computer 100's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for the OS 138, including providing essential services required by other parts of OS 138 and application programs 144, including memory management, process and task management, disk management, and mouse and keyboard management. Application programs 144 in the system memory of computer 100 may include various programs and modules for implementing the methods described herein, such as the current user activity data 62, current user sentiment logic/lists 64, a user interface for scheduling communications 66, and a contacts list or data 68.

The hardware elements depicted in computer 100 are not intended to be exhaustive, but rather are representative components suitable to perform the processes of the present invention. For instance, computer 100 may include alternate memory storage devices such as magnetic cassettes, digital versatile disks (DVDs), Bernoulli cartridges, and the like. These and other variations are intended to be within the spirit and scope of the present invention.

Figure 4:
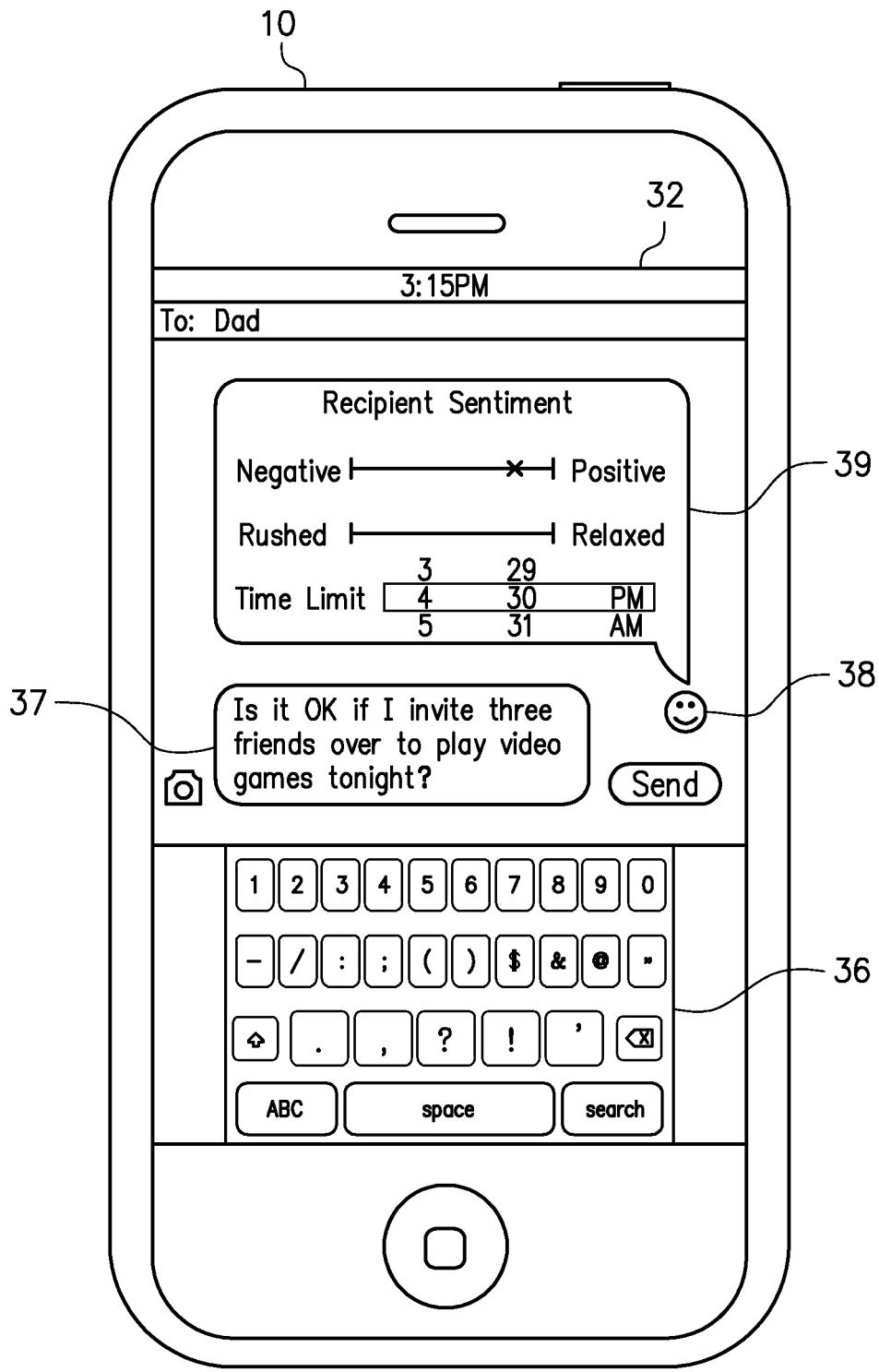
FIG. 4 is a diagram of a communication device of a first user (sender/initiator) having a display screen displaying an input screen for scheduling a communication.

FIG. 4 is a diagram of a communication device 10 of a first user (sender/initiator of a communication) having a display screen 32 displaying an input screen for scheduling a communication. Using a virtual keyboard 36, the user has entered a written text message to a second user that is identified as "Dad", where this name is associated with a phone number in a previously stored contacts list. The written text message is shown in a bubble 37 and contains the message "Is it OK if I invite three friends over to play video games tonight?" After entry of the text message, the first user could simply touch "SEND" so that the text message is immediately sent to "Dad." However, in accordance with various embodiments of the present invention, the first user may touch a special command or icon 38 (here, a smiley face) that causes the display of a menu or screen 39 allowing the user to enter sentiment based criteria for delivering the text message.

In the pop up screen 39, entitled "Recipient Sentiment", appears a first slide bar extending between "Negative" and "Positive" sentiments and a second slide bar extending between "Rushed" and "Relaxed" sentiments. The first user may touch the slide bar to enter a sentiment level along either or both of these two spectrums or scales. As shown, the first user has touched the first slide bar close to the "Positive" sentiment, which may equate to an "8" on a 10-point scale between "Negative" and "Positive" sentiment. No entry has been made on the second slide bar. The screen 39 also includes a "Time Limit" region for entry of a time of day by which the text message should be sent. As shown, the first user wants the text message delivered by 4:30 PM, regardless of the recipient's sentiment.

Figure 5:
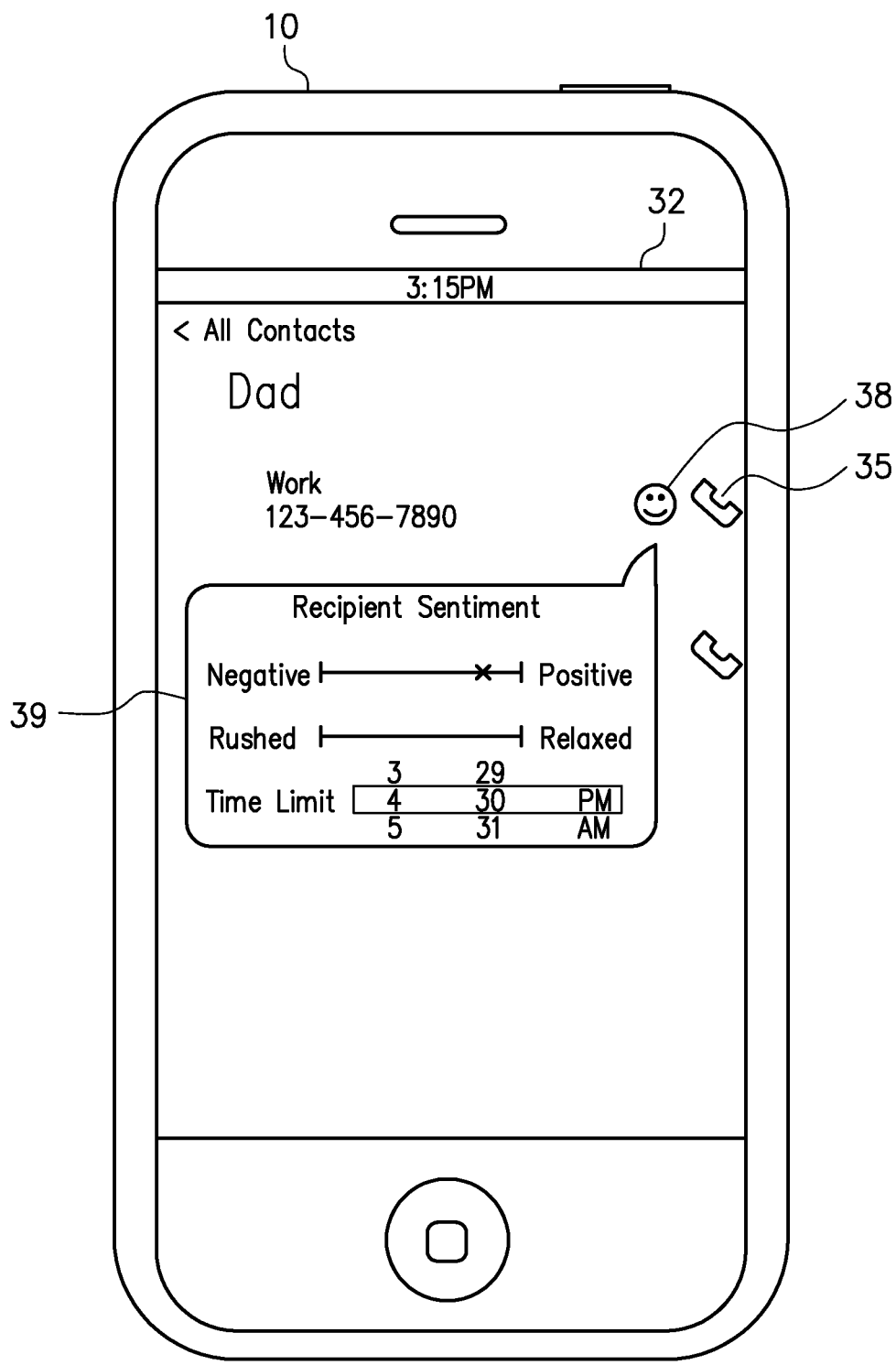
FIG. 5 is a diagram of a communication device of a first user (sender/initiator) having a display screen displaying a current sentiment for a second user.

FIG. 5 is a diagram of a first communication device 10 of a first user (sender/initiator of a communication) having a display screen 32 displaying an input screen for inputting a communication and/or identifying a target sentiment associated with a second user. This input screen displays a contact entry for "Dad" and may display various phone numbers, email addresses, physical addresses and the like. However, in horizontal alignment with the "work" phone number 123-456-7890 is an icon 35 for immediately initiating a phone call to "Dad" and a special command or icon 38 that causes the display of a menu or screen 39 allowing the user to enter sentiment based criteria for initiating a phone call. As shown, the first user has selected the icon 38 that displays the screen 39, which operates the same as the screen 39 in FIG. 4. Still, unlike a text message, when the current sentiment for the second user ("Dad") reaches the target sentiment of the slide bar (i.e., about 8 on a scale of 1 to 10), or upon reaching 4:30 PM, the system may either automatically initiate a call or provide an alert to the first user reminding them to initiate the call. The alert may be in the form of a pop-up screen including a reminder of the intended call (i.e., "Call Dad") and the second user's current sentiment. Preferably, the alert may include a call button or shortcut so that the first user can tap the button to confirm initiation of the call.

Figure 6:
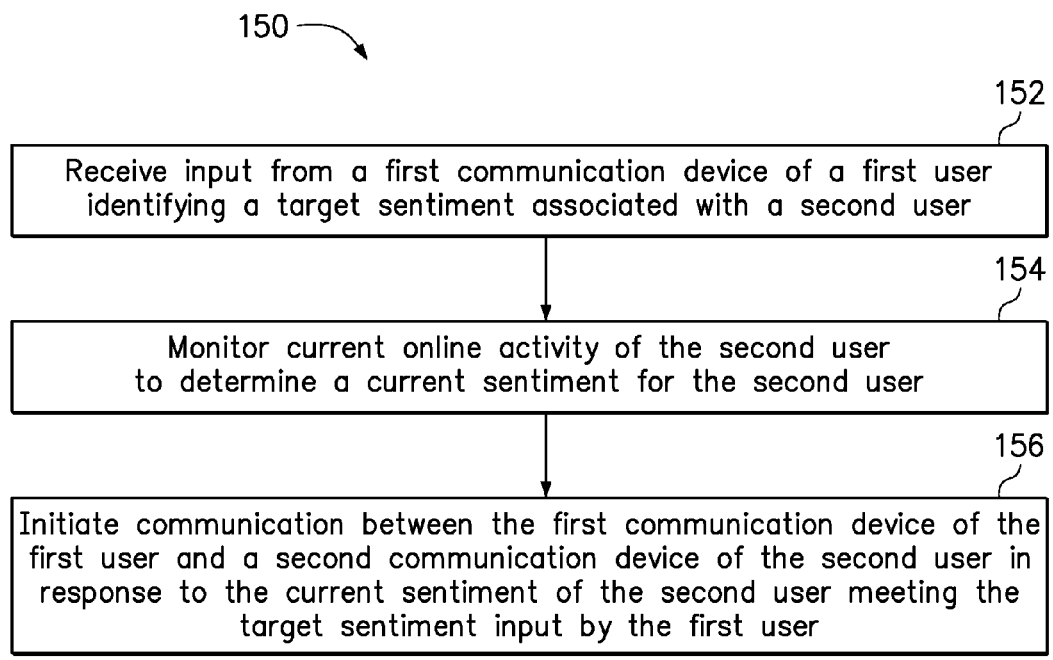
FIG. 6 is a flowchart of a method in accordance with one embodiment of the present invention.

FIG. 6 is a flowchart of a method 150 in accordance with one embodiment of the present invention. In step 152, the method receives input from a first communication device of a first user identifying a target sentiment associated with the second user. In step 154, current online activity of the second user is monitored to determine a current sentiment for the second user. Then in step 156, the method initiates communication between the first communication device of the first user and a second communication device of the second user in response to the current sentiment of the second user meeting the target sentiment input by the first user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer readable storage medium having program instructions embodied therewith, the program instructions executable by a processor to cause the processor to perform a method comprising:
    receiving input from a first communication device of a first user identifying a numerical sentiment threshold associated with a second user;
    monitoring current online activity of the second user to determine a current sentiment for the second user, wherein monitoring current online activity of the second user to determine a current sentiment for the second user, includes counting the number of instances that the second user uses a word from a positive sentiment list and subtracting the number of instances that the second user uses a word from a negative sentiment list over a period of time; and
    initiating the communication between the first communication device of the first user and a second communication device of the second user in response to the current sentiment of the second user reaching the numerical sentiment threshold input by the first user.

2. The computer program product of claim 1, the method further comprising:
    receiving input from a first communication device of the first user identifying a time limit for initiating communication between the first communication device and the second communication device, wherein initiating the communication includes initiating the communication before expiration of the time limit.

3. The computer program product of claim 1, wherein the communication is a written message.

4. The computer program product of claim 1, wherein the written message is received by the second communication device regardless of whether the current sentiment of the second user meets the target sentiment, and wherein the written message is not displayed on the second communication device until the current sentiment of the second user meets the target sentiment.

5. The computer program product of claim 1, wherein the communication is a written message in a form for delivery to the second communication device as a text message, email message, chat application message, message board post, or social network post.

6. The computer program product of claim 1, wherein the communication is a phone call, and wherein initiating the communication includes alerting the first communication device that the current sentiment of the second user meets the target sentiment input by the first user.

7. The computer program product of claim 1, wherein a first communication device of the first user sends a request for a current sentiment to the second communication device of the second user.

8. The computer program product of claim 7, wherein the request is sent periodically during a period after receiving the input identifying a target sentiment and until the communication has been initiated between the first communication device and the second communication device.

9. The computer program product of claim 1, wherein the second communication device pushes the current sentiment to one or more systems accessible to the first communication device.

10. The computer program product of claim 9, wherein the one or more systems are selected from a social network, an email group, and a list of mobile communication devices.

11. The computer program product of claim 1, wherein the method further comprises:
    modifying an avatar associated with the second user based on the current sentiment of the second user, wherein the avatar is a personalized graphic designed to represent the second user, and wherein the avatar is displayed on the first communication device in association with the second communication device.

12. A computer program product comprising a computer readable storage medium having program instructions embodied therewith, the program instructions executable by a processor to cause the processor to perform a method comprising:
    receiving input from a first communication device of a first user identifying a target sentiment associated with a second user, wherein the target sentiment is a target sentiment category selected from among a plurality of sentiment categories, wherein each sentiment category has a list of words associated with the sentiment category;
    monitoring current online activity of the second user to determine a current sentiment for the second user, wherein monitoring current online activity of the second user to determine a current sentiment for the second user, includes counting the number of instances that the second user uses a word from each sentiment category during a period of time and determining the current sentiment that has the greatest number of instances during the period of time; and initiating the communication between the first communication device of the first user and a second communication device of the second user in response to the current sentiment of the second user meeting the target sentiment input by the first user.

13. The computer program product of claim 12, wherein the plurality of sentiment categories includes a positive sentiment category and a negative sentiment category.

14. The computer program product of claim 12, wherein the plurality of sentiment categories includes a rushed sentiment category and a relaxed sentiment category.

15. A computer program product comprising a computer readable storage medium having program instructions embodied therewith, the program instructions executable by a processor to cause the processor to perform a method comprising:

receiving input from a first communication device of a first user identifying a target sentiment associated with a group of users, wherein the group of users includes a plurality of users, and wherein the target sentiment is a numerical sentiment threshold;

monitoring current online activity of the plurality of users to determine a current average sentiment for the group of users, wherein monitoring current online activity of the plurality of users to determine a current average sentiment for the group of users, includes counting the number of instances that the plurality of users use a word from a positive sentiment list and subtracting the number of instances that the plurality of users use a word from a negative sentiment list over a period of time; and initiating the communication between the first communication device of the first user and a plurality of communication devices of the plurality of users in response to the current average sentiment for the group of users reaching the numerical sentiment threshold input by the first user.

16. A computer program product comprising a computer readable storage medium having program instructions embodied therewith, the program instructions executable by a processor to cause the processor to perform a method comprising:

receiving input from a first communication device of a first user identifying a target sentiment associated with a group of users, wherein the group of users includes a plurality of users, wherein the target sentiment is a target sentiment category selected from among a plurality of sentiment categories, wherein each sentiment category has a list of words associated with the sentiment category;

monitoring current online activity of the plurality of users to determine a current average sentiment for the group of users, wherein monitoring current online activity of the plurality of users to determine a current average sentiment for the group of users, includes counting the number of instances that the plurality of users use a word from each sentiment category during a period of time and determining the current sentiment that has the greatest number of instances during the period of time; and initiating the communication between the first communication device of the first user and a plurality of communication devices of the plurality of users in response to the current average sentiment for the group of users meeting the target sentiment input by the first user.

* * * * *